Jan. 8, 1963 J. F. DAVIS 3,072,042
COFFEE MAKER
Filed Feb. 13, 1961

INVENTOR.
JAMES F. DAVIS
BY
Edward D. O'Brian
ATTORNEY

United States Patent Office 3,072,042
Patented Jan. 8, 1963

3,072,042
COFFEE MAKER
James F. Davis, 17154 Nordhoff St., Northridge, Calif.
Filed Feb. 13, 1961, Ser. No. 88,718
9 Claims. (Cl. 99—283)

This invention pertains to a new and improved coffee maker.

This application is related to the prior application for U.S. Letters Patent Serial No. 474,689, filed December 13, 1954, now Patent 2,868,109, and to the now pending application for U.S. Letters Patent Serial No. 796,-998, filed January 12, 1959, now Patent No. 2,981,487, issued April 25, 1961, and is a continuation in part of both of these prior applications. The entire disclosures of both of these applications are incorporated herein by reference. This application contains subject matter which is common to both of these prior applications, which subject matter has been continuously pending before the U.S. Patent Office in these applications since December 13, 1954.

The term "coffee" commonly has two different meanings. This term is more properly used to describe beans of the so-called coffee plant. The term "coffee" is, however, more commonly used to designate an aqueous infusion prepared from ground and roasted beans of this plant. The flavor of coffee as a beverage or infusion can be varied considerably depending upon the nature and character of an infusion process. It can also be varied depending upon the nature of the beans used in preparing ground particles for use in the infusion process as well as the duration of time between the grinding of such beans and the preparation of the beverage, coffee.

At the present time the consumption of the beverage coffee is, in effect, almost a national pasttime in many countries. Different nationalities appear to prefer different types of infusions prepared by different standards or methods so as to achieve certain flavor characteristics. In coffee these flavor characteristics are determined by the nature of the coffee beans used in preparing ground coffee and, more specifically, by various volatile and soluble flavoring compounds found within these beans. The precise chemical structures of such compounds are only partially known at the present time.

It is, however, known that certain desirable flavoring producing compounds in coffee are either lost or destroyed by prolonged storage of ground coffee beans. It is also known that the flavor of coffee can be deleteoriously affected by extracting ground coffee beans under such conditions that various undesirable oils and the like are removed from them along with desired flavor forming ingredients. It is also considered that the accumulation of deposits of material from ground and roasted coffee beans within the interior of any apparatus for preparing the infusion or beverage, coffee, will have a deleteorious, undesirable affect upon the flavor of the final infusion. It is also considered that the temperature of such beverage should be maintained at substantially the temperature at which it is prepared until it is consumed if the flavor of this beverage is to be of a desired character.

The present invention is designed so as to provide coffee makers which take all of these factors into consideration and which are constructed so as to achieve a desirable, "good" flavor in the beverage coffee. A further object of this invention is to provide coffee makers as described which may be used to prepare coffee directly from ground coffee beans so as to eliminate any loss of flavor by prolonged storage of ground coffee. Another objective of the present invention is to provide coffee makers which will brew a desired quantity of coffee under such conditions that undesirable flavor forming ingredients are not extracted from ground coffee beans. A still further object of the present invention is to provide coffee makers in which the brewing chamber is rinsed between successive coffee brewing cycles under such conditions that the accumulation of flavor affecting ingredients within such a chamber is minimized. An object of the present invention is to provide devices of this type which make and store the beverage coffee at an elevated temperature corresponding roughly to the temperature employed during the brewing of coffee until such time as this beverage is ready to use.

Another object of this invention is to provide coffee makers which are essentially of an automatic character and which can be used by restaurants, business establishments or the like so as to make the beverage coffee with a minimum of difficulty and with a minimum consumption of labor and can hold this beverage at an elevated temperature until it is used. Still further objectives are provide coffee makers as indicated which are comparatively simple and inexpensive to construct and which may be easily and conveniently used so as to make "good" coffee. A related object of the present invention is to provide coffee makers as herein described which require little servicing during their use but which can be easily and conveniently serviced when such servicing is required.

These and other objects of this invention, as well as many specific advantages of it will be more fully apparent from a detailed consideration of the remainder of this description including the appended claims and the accompanying drawing in which:

Figure 1:
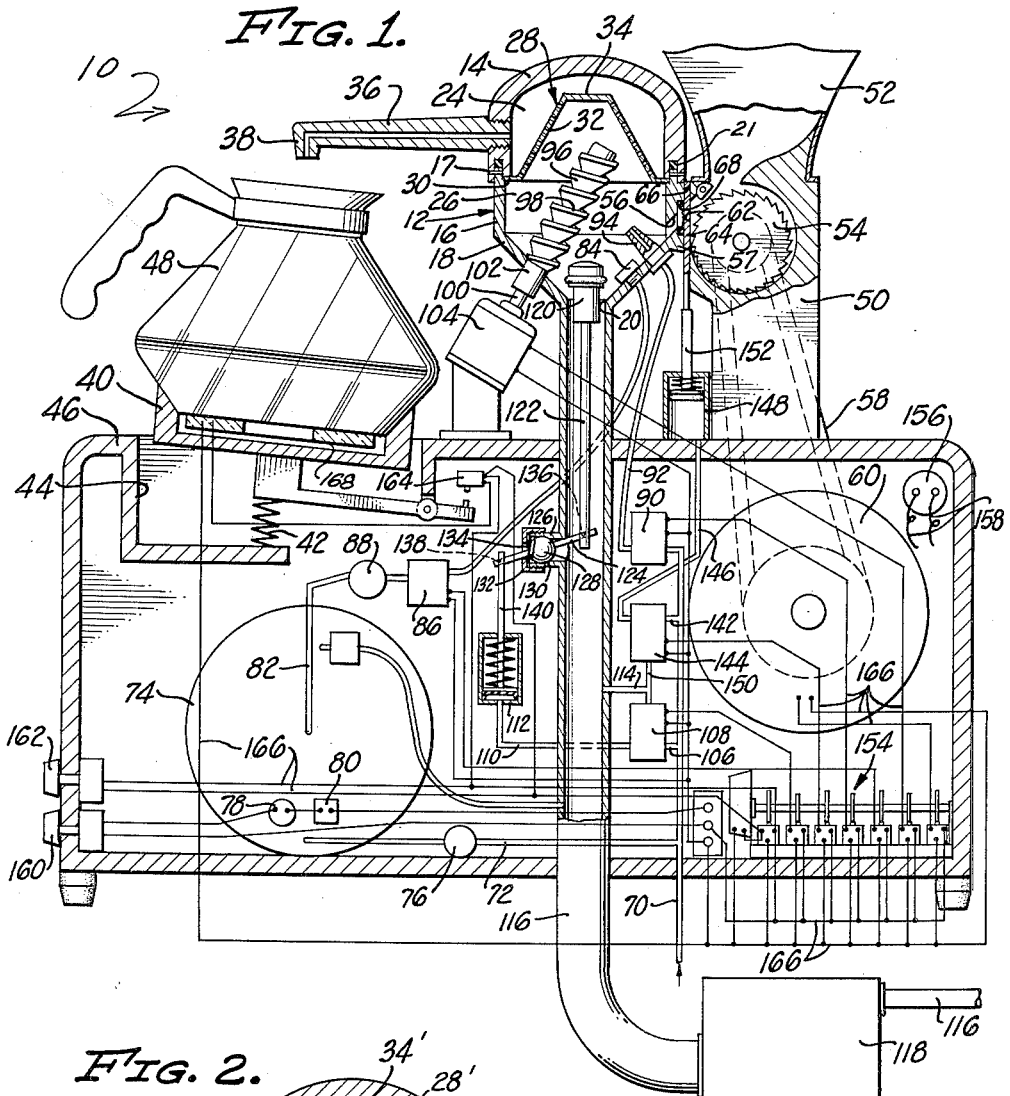
FIG. 1 is a side elevational view, partially in section and partially diagrammatic form, of a coffee maker of this invention.

The accompanying drawing is not to be taken as limiting this invention for the reason that various modified coffee makers utilizing the essential features or principles herein described may be readily designed or built through the use or exercise of routine engineering skill or ability. The accompanying drawing is solely presented for the purpose of clearly showing the character of presently preferred embodiments of this invention. It will be realized that sizes and shapes of various parts of the coffee makers shown may be changed in accordance with routine design ability without affecting the inherent nature of the devices as shown.

As an aid to understanding this invention it may be stated in essentially summary form that it concerns coffee makers, each of which includes a brewing chamber which preferably has a specific type of shape as hereinafter described. Such a chamber is designed and used so that during a coffee making cycle freshly ground coffee beans are supplied to it from a grinder used in conjunction with it and so that after such ground beans are located within such a chamber these beans are agitated with water at an elevated temperature of between 200°–210° F. so as to produce an aqueous infusion known as the beverage coffee, and so that such a beverage, after being brewed, is supplied to a retaining vessel used in conjunction with a coffee maker of this invention and is held within such a vessel at an elevated temperature. In the preferred aspects of this invention when this vessel becomes "full" means are provided for ceasing the brewing operation and for effectively rinsing and cleaning the brewing chamber utilized so as to place the coffee maker in readiness for another brewing cycle.

*Structure*

In the accompanying drawing there is shown a coffee maker 10 which includes a brewing chamber 12 having a generally domed-shaped top 14, the periphery of which overlies and fits tightly against the top of a continuous side wall 16 extending completely around the lower edge of the top 14. The lower edge of the wall 16 is attached to a bottom wall 18 which slopes toward a centrally located drain opening 20. With this construction the top 14 is preferably attached to the side wall 16 by means of bayonet connections 17 of a conventional construction. An elastomeric sealing washer 21 is preferably used between the top 14 and the wall 16 as shown. However, if desired, the top 14 may be secured upon the side wall 16 through the use of screw threads or the equivalent. Other equivalent structures can, of course, be employed so as to hold the parts defining the complete brewing chamber 12 together.

When this chamber 12 is assembled it is preferably divided into upper and lower areas, 24 and 26, respectively by means of a filter 28. This filter 28 is provided with a peripheral flange 30 which is clamped between the top 14 and the side wall 16. It is formed so that a principal screen or screen-like filter part 32 of it having the shape of a frustum of a right circular cone is directed upwardly. The uppermost extremity of the part 32 is preferably attached to an imperforate top 34. If desired, however, the top 34 may be perforate.

Within the maker 10 a spout 36 is attached to the lowermost portion of the top 14 so as to extend from the upper area 24 away from the brewing chamber 12. The terminus 38 of the spout 36 remote from the brewing chamber 12 is preferably directed downwardly so as to face a platform 40. This platform 40 is, in the embodiment of the invention illustrated, movably mounted upon springs 42 within a recess 44 in a cabinet 46 holding many of the parts of the maker 10. This platform 40 is designed so as to hold an appropriate conventional receptacle 48 for the beverage prepared using the maker 10. Such receptacle is, as shown, vertically directed when held upon the platform 40 so as to directly receive beverage from the terminus 38 and the spout 36.

Upon the cabinet 46 there is preferably mounted a grinder base 50 which in turn supports a hopper 52 which is adapted to contain roasted but unground coffee beans. This hopper 52 is used to hold such beans so that they are automatically conveyed by gravity to adjacent to a series of grinding elements 54 which grind such beans and conveys them through a passage 56 through which they pass to the lower area 26 of the brewing chamber 12. This passage 56 is formed or defined by a body 57 connecting the base 50 and the chamber 12. The structure employed for the grinder base 50 and the elements 54 is preferably as described in the aforenoted application Serial No. 796,998. If desired, an appropriate adjustment for the fineness of the grinding operation (not shown) as indicated in this prior application can be used in connection with the elements 54. These elements 54 may conveniently be powered through a V belt and pulley drive 58 by an electric motor 60 mounted upon the cabinet 46. Other equivalent drive means may, of course, be utilized with them.

The body 57 preferably includes a slot 62 which traverses the passage 56. A slide valve body 64 fits closely within this slot 62. This valve body 64 preferably contains an opening 66 which is adapted to be aligned with the passage 56 when it (the valve body 64) is located in an open position. Sealing means 68 such as elastomeric O-rings are preferably disposed against the surface of the valve body 64 adjacent to the brewing chamber 12 so as to form a seal against this valve body 64 at all times.

During the operation of the coffee maker 10 water is supplied to it through an inlet or supply pipe 70 which extends into the cabinet 46. This inlet pipe 70 is connected by means of a lateral 72 to a hot water tank 74. If desired, a filter element 76 can be connected with this lateral 72 for the obvious purpose. The tank 74 may be heated by either gas or electrical means. Preferably however, it is provided with an electric heating element 78 which is controlled by means of an attached thermostat 80 so that the temperature within this tank 74 is maintained to within the range of from about 200°–210° F. at all times.

It will be noted that the lateral 72 is connected to the lowermost extremity of the tank 74 and that the heating element 78 is located adjacent to the bottom of this tank. This is because hot water normally tends to rise. With this construction the temperature of the coldest water within the tank 74 will be determinative as far as the operation of the heating element 78 is concerned. This is also so that hot water may be withdrawn through a connecting pipe 82 to a small check valve 84 mounted upon the bottom wall 18 of the brewing chamber 12 adjacent to the drain opening 20. The flow of water through the pipe 82 is controlled by means of a solenoid control valve 86 located within the pipe 82. If desired, a pressure regulator valve 88 may also be located within this pipe.

The supply pipe 70 is also directly connected to another solenoid control valve 90 which is turn is connected by means of a further pipe 92 to a nozzle 94 mounted upon the bottom wall 18 of the chamber 12 so as to be directed upwardly at an angle to the vertical within the lower area 26 of this chamber 12 generally toward the filter 28 and toward an agitator 96. This agitator 96 includes a rod 98 having a helical exterior shape. This rod is rotatably mounted upon a shaft 100 extending through a water-tight bearing 102 located upon the bottom wall 18 of the brewing chamber 12. The shaft 100 is adapted to be rotated by a small electric motor 104 mounted upon the cabinet 46. As indicated in the drawing, the rod 98 extends at an angle to the vertical across the lower area 26 of the brewing chamber 12.

A lateral 106 leads from the supply pipe 70 to a solenoid control valve 108. This valve 108 is connected by means of pipes 110 to one side of a "spring loaded" hydraulic cylinder 112 and by means of another pipe 114 to a principal drain pipe 116. The drain pipe 116 in the coffee maker 10 is attached to the bottom wall 18 of the brewing chamber 12 around the opening 20 so as to extend vertically therefrom to a conventional sewer or similar connection (not shown). If desired, a conventional filter trap 118 can be located within this drain pipe 116 for the purpose of catching coffee grounds during the operation of the complete coffee maker 10 so as to avoid sewer cloggage. If such a filter trap 118 is used preferably it is of a type which may be easily cleaned out.

Generally "within" the bottom wall 18 of the brewing chamber 12 there is located a movable valve body 120 of an inert, somewhat elastomeric or flexible material which is capable of being moved so as to open and close the drain opening 20. This valve body 120 is preferably attached to a rod 122 which extends down through the drain pipe 116 to adjacent to an actuating rod 124. This actuating rod 124 extends completely through a lateral, T-like fitting 126 located on the drain 116 and also projects through an attached ball 128 located within this fitting. Preferably the fitting 126 includes an annular shoulder 130 and a ferrule-like cap 132 which bears against a coil spring 134 so as to normally force the ball 128 into a sealed position with respect to the shoulder 130. As shown the actuating rod 124 projects through the cap 132 and the spring 134.

This rod 124 may be attached to the rod 122 in any of a variety of different ways. A suitable method is as shown in the drawing. Here the rod 124 is illustrated as projecting through a hole 136 of larger dimension than this rod 124 formed in rod 122. The actuating rod 124 in the embodiment shown projects through a smaller hole 138 in a piston rod 140 which extends from the hydraulic cylinder 112 and which is moved during the operation of this cylinder. Other types of connections than the specific connection used at the ends of the rod 124 may, of course, be employed. This arrangement is intended so that during the actuation of the hydraulic cylinder 112 the valve body 120 may be moved between open and closed positions.

Another lateral 142 from the supply pipe 70 leads to a further solenoid control valve 144. Pipes 146 leading from this valve 144 connect it to the extremities of another hydraulic cylinder 148. The valve 144 is also connected to the drain pipe 116 by means of another pipe 150. The hydraulic cylinder 148 carries a piston rod or ram 152 which is directly secured to the valve body 64. This hydraulic cylinder 148 is of course aligned with the slot 62 so that during actuation of the cylinder 148 the valve body 64 may be moved back and forth between open and closed positions in which the opening 66 is aligned with the passage 56 or is removed from this passage.

Within the cabinet 46 there is mounted a complete function programmer 154 of a known type which is designed to directly or indirectly control the operation of all of the various parts of an operative character previously described. The function programmer 154 may be constructed in any of a variety of manners well known to the art of such devices. The particular programmer 154 consists of a timer operatively connected to a shaft carrying a plurality of cam lobes as described in the aforenoted Patent #2,868,109. Other equivalent devices may be used for the same purpose. Similarly a variety of connecting switches etc., may be operatively assembled so as to accomplish a programming function as hereinafter described in connection with the operation of the coffee maker 10.

This electrical programmer 154 is supplied with power from a conventional electrical outlet through the use of a terminal plug 156 mounted on the cabinet 46. The plug 156 is connected to the programmer 154 by means of wires 158. These wires 158 are preferably connected within the programmer 154 so that when a switch 160 on the outside of the cabinet 46 is turned to an on position, power is supplied to the heating element 78 which is controlled by the thermostat 80 so as to constantly maintain the temperature of water within the tank 74. Another switch 162 which is also mounted so as to extend from the outside of the cabinet 46 is connected within the programmer 154 so that upon the actuation of this switch 162 the complete coffee maker 10 operates as hereinafter described. A further switch 164 is mounted within the recess 44 so as to be actuated by contact with the platform 40. These switches 160, 162 and 164 are all connected to the programmer 154 by means of wires 166. Similar wires are connected to the solenoid control valves 86, 90, 108 and 144 and to the motors 60 and 104.

*Operation*

When it is desired to connect up the coffee maker 10 for use, the supply pipe 70 and the drain pipe 116 are of course connected to conventional plumbing connections in the established manner and electric power is supplied to this coffee maker 10 through the plug 156. When connected in this manner the coffee maker 10 may be left standing in a shop, restaurant or the like without being used. When, however, it is thought that it may be desired to use this coffee maker the switch 160 is actuated. This allows water within the tank 74 to become heated to a desired temperature for preparing coffee.

When it is actually desired to use the coffee maker 10 to prepare coffee the switch 162 is actuated. This actuates the programmer 154 as described in said Patent 2,868,109 so as to in turn cause the solenoid control valve 108 to be actuated so as to admit water under line pressure to the hydraulic cylinder 112. This in turn causes movement of the piston rod 140 so as to move the valve body 120 to a closed position. After this is done the valve 108 is shut off, by the programmer 154 causing hydraulic fluid to be held within the piston 112, so as to firmly hold the valve body in a closed location within the drain opening 20.

Next the function programmer 154 causes the valve 144 to be actuated so as to cause the line pressure of water supplied to the coffee maker 10 to actuate the hydraulic cylinder 148 in order to cause the valve body 64 to be moved to an open position. At this point the programmer may cause the valve 144 to be shut off, locking water within the hydraulic cylinder 148 so that the valve body 64 is securely held in such an open position.

The programmer 154 then supplies power to the motor 60. This in turn causes the grinder elements 54 to rotate so as to grind coffee beans (not shown) and so as to cause such ground coffee to pass to within the lower area 26 of the brewing chamber 12. The programmer 154 preferably is set so as to grind for a predetermined period sufficient to create a quantity of ground coffee corresponding to the amount of the infusion or beverage which is desired to make at any one time or in any one cycle of operation within the maker 10.

After the motor 60 has been operated for a sufficient time to accomplish this result, the valve 144 is again actuated by this programmer 154 so as to cause the valve body 64 to be moved to a closed position and then this valve 144 is shut off locking the valve body 64 in such a closed position. Next the valve 86 is actuated by the programmer 154 so as to permit hot water to diffuse into the interior of the brewing chamber 12 through the check valve 84. Simultaneously the motor 104 is actuated by the programmer 154. At this point the programmer 154 no longer functions until actuated later in the operation of the maker 10. However, the motor 104 continues to operate, and hot water continues to pass into the brewing chamber 12. This eliminates the necessity of controlling the flow of liquid into the chamber 12 during a brewing cycle. As a result of this ground coffee and water will be intermixed within the brewing chamber 12. The particles of ground coffee present in this brewing chamber are, of course, confined to the lower area 26 by means of the filter 28.

The infusion resulting from such contact will pass through this filter 28 and will be conveyed through the spout 36 to the receptacle 48. During this operation some vapors will arise which will accumulate within the domed shaped top 14 of the brewing chamber 12. Such vapors will not interfere with a continuous stream of the beverage coffee passing through the spout 36. By virtue of the shape of the filter 28 coffee grounds will not tend to clog this filter and will be continuously agitated through the rotation of the agitator 96. This agitator 96 is of such a form so as to constantly cause a "pulling down" of ground coffee away from the filter 28 as well as a constant agitation of the material present in the chamber 12.

The springs 42 are, in the coffee maker 10, proportioned so that when the receptacle 48 becomes full the platform 40 moves into engagement with the switch 164 actuating this switch. When this is accomplished the programmer 154 is actuated so as to cause the valve 86 to be shut off. Immediately after this the valves 108 and 90 are opened by the programmer 154 and the agitator 96 continues to operate. This causes the valve body 120 to be moved to an open or drain position and to cause a stream of cold water to be emitted through the nozzle 94 into the interior of the brewing chamber 12. This nozzle 94 is preferably directed toward the imperforate top 34 so as to be "splashed" by contact with the top. Such a stream of water is also "splashed around" within the interior of the lower area 26 of this chamber 12 by the agitator 96 so as to cause a complete and thorough washing action. The water consumed during this washing action is conveyed from the coffee maker 10 through a drain pipe 116. Such water obviously carries with it any coffee grounds present within the brewing chamber 12. After a comparatively short washing interval of this type the function programmer 154 stops the agitator 96, the flushing operation and its own operation. The entire coffee maker is then ready to be used for another coffee brewing cycle as hereinafter described upon actuation of the switch 164.

Preferably the platform 40 holds a small electric heating element 168 which is designed so as to heat the receptacle 48 and maintain the temperature of any infusion located within it at about the temperature at which this infusion is conveyed from the brewing chamber 12. This heating element 168 is preferably connected as shown so as to be controlled by the switch 164. If desired, however, an appropriate other switch (not shown) may be connected to the programmer 154 so as to control the operation of the heating element 168 for any desired period of time.

Modified Structure

Figure 2:
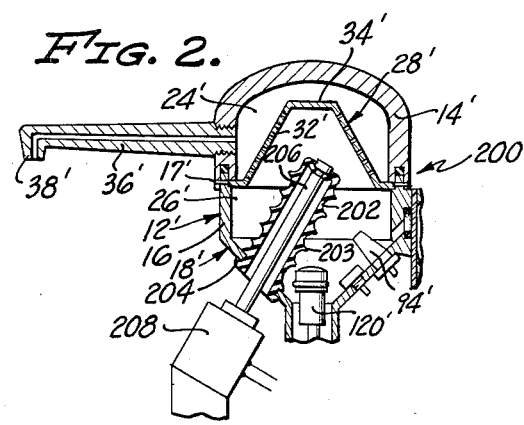
FIG. 2 is a partial side elevational view corresponding to FIG. 1 showing in section a part of a modified coffee maker of this invention which is essentially similar to the coffee maker shown in FIG. 1.

In FIG. 2 of the drawing there is shown a modified coffee maker 200 of the present invention which is essentially the same as the coffee maker 10 except as hereinafter described. Because of such similarity various parts which are identical in both the coffee maker 10 and 200 are not separately described herein and many of these parts are not illustrated in the accompanying drawing. Those parts which are essentially the same in both the coffee maker 10 and 200 and which are illustrated in the accompanying drawing and/or described in this specification are, for convenience of designation, indicated by the primes of the numerals previously used in describing the coffee maker 10.

The modified coffee maker 200 differs from the coffee maker 10 as to the agitator structure within the brewing chamber 12'. In the coffee maker 200 the agitator 96 is not utilized and in its place another agitator 202 having the form of an elongated, inert somewhat resilient sleeve is employed. As illustrated, the exterior of this agitator 202 is provided with a series of ridges 203. One end of the agitator 202 is attached to a ferrule 204 mounted on the bottof wall 18' of the chamber 12'. The other end of it is secured to a rod 206. This rod extends through the agitator 202 to the outside of the chamber 12' where it is attached to a small vibrator 208 of a type adapted to provide axial movement to the rod 206 and to the agitator 202. This vibrator 208 is preferably connected to other parts of the coffee maker 200 in substantially the same manner as the motor 104 is connected within the coffee maker 10.

The operation of the modified coffee maker 200 is essentially identical to the operation of the coffee maker 10. For this reason no separate description of the operation of it is set forth herein. The agitator 202 accomplishes the same type of function as the agitator 96.

Because of the nature of this invention and the fact that various design changes may be made in the structure shown and described without departing from the basic principles of this invention, the invention itself is considered as being limited solely by the appended claims forming a part of this specification.

I claim:
1. An apparatus for making aqueous infusions which includes:
    brewing chamber means having a domed-shaped top, a continuous side wall extending downwardly from the periphery of said top and a bottom attached to the lower extremity of said side wall, said bottom being slanted toward and including a drain opening;
    drain pipe means attached to said bottom so as to extend from said drain opening;
    filter means positioned within said brewing chamber means so as to divide said brewing chamber means into upper and lower areas;
    spout means extending from said upper area for conveying an aqueous infusion therefrom;
    means for introducing ground solid material into said lower area;
    means for supplying water into said lower area:
    agitating means extending into said lower area for agitating a mixture of water and ground material therein;
    drain valve means for closing said drain opening during a brewing cycle so as to permit liquid to leave said brewing chamber means only through said spout means; and
    function programmer means for controlling the operation of said means for introducing ground solid material, said means for supplying water, said means for agitating and said drain valve means so as to operate said complete apparatus for making aqueous infusions so that periodically an infusion is brewed within said brewing chamber means and is conveyed therefrom through said spout means and so that said brewing chamber means is then rinsed clean prior to its being reused in brewing an aqueous infusion.

2. An apparatus as defined in claim 1 wherein the entrance to said spout from said chamber means is located beneath the top of said chamber means.

3. An apparatus as defined in claim 1 wherein said filter has a conical shape and wherein the periphery of said filter is attached to said side wall of said chamber means, and wherein the center portion of said filter is located above the periphery of said filter.

4. An apparatus as defined in claim 3 wherein said filter has a flat imperforate top extending generally parallel to said top and said bottom of said chamber means.

5. An apparatus as defined in claim 1 wherein said means for introducing ground solid material includes bin means;
    grinder means attached to said bin means so as to receive material from said bin means;
    passage means leading from said grinder means into the interior of said lower area of said chamber means, said passage means including valve means located therein, said valve means being capable of being actuated so as to close said passage means.

6. An apparatus as defined in claim 1 wherein said means for supplying water includes: nozzle means for supplying wash water located on said bottom in said lower area of said chamber means so as to be directed toward the interior of said chamber means and other inlet means for supplying hot water into the interior of said chamber means, said other inlet means being located on said bottom of said chamber means.

7. An apparatus as defined in claim 1 wherein said agitating means includes a helical screw rotatably mounted so as to extend into the interior of said lower area of said chamber means and means for rotating said helical screw operatively associated therewith.

8. An apparatus as defined in claim 1 wherein said drain valve means includes a stopper located within said lower area of said chamber means, and means for moving said stopper within said drain opening so as to close said drain opening.

9. An apparatus as defined in claim 1 including first switch means for starting said function programmer, said first switch means being operatively associated with said function programmer, platform means located generally beneath the outlet from said spout means, said platform means being capable of holding a receptacle for an aqueous infusion and being movable, and other switch means operatively associated with said platform means, said other switch means being responsive to the weight of a container and an aqueous infusion held therein and being operatively associated with said function programmer means so as to actuate said function programmer means in order to stop a brewing operation within said brewing chamber means and so as to cause said brewing chamber means to be rinsed.

References Cited in the file of this patent

UNITED STATES PATENTS

| | | |
|---|---|---|
| 2,149,270 | Burgess | Mar. 7, 1939 |
| 2,868,109 | Davis | Jan. 13, 1959 |

FOREIGN PATENTS

| | | |
|---|---|---|
| 518,182 | Italy | Mar. 4, 1955 |